(12) United States Patent
Hendrey

(10) Patent No.: US 8,990,288 B2
(45) Date of Patent: Mar. 24, 2015

(54) DYNAMICALLY CONFIGURED RENDERING OF DIGITAL MAPS

(75) Inventor: Geoffrey R. Hendrey, San Francisco, CA (US)

(73) Assignee: deCarta Inc., San Jose, CA (US)

(*) Notice: Subject to any disclaimer, the term of this patent is extended or adjusted under 35 U.S.C. 154(b) by 396 days.

(21) Appl. No.: 11/865,720

(22) Filed: Oct. 1, 2007

(65) Prior Publication Data

US 2008/0147824 A1 Jun. 19, 2008

Related U.S. Application Data

(60) Provisional application No. 60/827,665, filed on Sep. 29, 2006.

(51) Int. Cl.
G06F 15/16 (2006.01)

(52) U.S. Cl.
USPC .......................................................... 709/203

(58) Field of Classification Search
USPC ..................... 709/217, 219, 227, 228, 203
See application file for complete search history.

(56) References Cited

U.S. PATENT DOCUMENTS

| | | | | |
|---|---|---|---|---|
| 6,636,802 | B1 * | 10/2003 | Nakano et al. | 701/532 |
| 7,933,929 | B1 * | 4/2011 | McClendon et al. | 707/802 |
| 2002/0075511 | A1 * | 6/2002 | Lorne | 358/1.15 |
| 2002/0116121 | A1 | 8/2002 | Ruiz et al. | |
| 2002/0152266 | A1 | 10/2002 | Burfeind et al. | |
| 2003/0140056 | A1 * | 7/2003 | Wall et al. | 707/102 |
| 2004/0117358 | A1 * | 6/2004 | von Kaenel et al. | 707/3 |
| 2006/0149700 | A1 | 7/2006 | Gladish et al. | |

OTHER PUBLICATIONS

PCT International Search Report and Written Opinion, PCT/US2007/80129, Jul. 29, 2008.
Australian Office Action, Australian Application No. 2007303470. Sep. 14, 2010, 3 pages.
Chinese Office Action, Chinese Application No. 200780043988.8, Oct. 8, 2010, 13 pages.
European Extended Search Report, European Application No. 07853726.3, Jul. 7, 2011, 9 pages.
Tang, K.X. et al., "The Internet, GIS and Public Participation in Transportation Planning," Progress in Planning, Pergamon, Jul. 2005, pp. 7-62, vol. 64, No. 1.
Zhao, F. et al., "Dynamic Web Map Service for Web Publishing System of Mass Remote Sensing Images," IEEE International Conference on Geoscience and Remote Sensing Symposium, Jul. 2006, pp. 849-851.
Chinese Office Action, Chinese Application No. 200780043988.8, Feb. 29, 2012, 13 pages.

* cited by examiner

*Primary Examiner* — Sulaiman Nooristany
(74) *Attorney, Agent, or Firm* — Fenwick & West LLP

(57) ABSTRACT

Digital map rendering using dynamically updatable map configuration files is enabled. A map designer creates a map configuration file that specifies customizable attributes of a rendered map and stores the configuration file in a data store, either on the same local network as the map server that will be rendering the map, or at a remote location. The map configuration file can be included on a web page, wiki page, blog, etc. When a client requests a rendered map from the map server, the request specifies the location of the map configuration file to be used in the rendering. The map server retrieves the map configuration file and renders the map in accordance with the settings in the configuration file. The map server returns the rendered map to the client. In such a manner, the developer can modify the map configuration file and immediately effect subsequently rendered maps.

20 Claims, 4 Drawing Sheets

FIG. 4

Cartographic Style Editor — 400

Open | Save As | Point | Line | Area | Global | deCarta

Styles

Current Selection: City Streets ▼ | New | Clone | Delete

- City Streets
- Avenues
- Boulevards
- Lanes
- Courts
- Freeways

Foreground Color: FFCC00
Foreground width: 1 ▼
Outline Color: FFFFFF
Outline width: 2 ▼

Apply | Auto Preview | Preview | Change Location

| Category | Priority | Pattern1 | Pattern2 | Fill | Outline | Font | Scale |
|---|---|---|---|---|---|---|---|
| PARK | null | usage=Any | "" | #D5E2B7 ▽ | none ▽ | ARIAL: 8pt #3E583F ▽ | k0-k8 |
| PARK | null | usage=Any | "" | #D5E2B7 ▽ | none ▽ | ARIAL: 7pt #3E583F ▽ | k8-k50000 |
| WATER | null | usage=Any | "" | #9FDBFF ▽ | none ▽ | ARIAL: 7pt #6496B1 ▽ | k0-k50000 |
| CAMPUSES | null | usage=Any | "" | #C0C0C0 ▽ | none ▽ | ARIAL: 8pt #3E583F ▽ | k0-k50000 |
| CAMPUSES | null | usage=Any | "" | #C0C0C0 ▽ | none ▽ | none ▽ | k3-k8 |
| POLITICAL | null | usage=Any | "" | #F0ECE0 ▽ | none ▽ | ARIAL: 8pt #3E583F ▽ | k0-k50000 |
| INTERIOR | null | usage=Any | "" | #F0ECE0 ▽ | 1px #C6C19B ▽ | ARIAL: 8pt #3E583F ▽ | k0-k8 |
| INTERIOR | null | usage=Any | "" | #CBCF5B ▽ | none ▽ | ARIAL: 8pt #3E583F ▽ | k8-k50000 |
| BUILDING | null | usage=Any | "" | | none ▽ | none ▽ | k0-k8 |
| BUILDING | null | usage=Any | "" | | none ▽ | none ▽ | k0-k50000 |
| VENDOR | null | usage=Any | "" | | none ▽ | none ▽ | k0-k50000 |
| CAMPUSES | null | usage=Any | "" | #C0C0C0 ▽ | 2px #1E1E1E ▽ | ARIAL: 8pt #000000 ▽ | k0-k3 |

New | Clone | Delete

Scale: 0.3 km | Scale: 2 km | Scale: 10 km | Scale: 50 km

402

DYNAMICALLY CONFIGURED RENDERING OF DIGITAL MAPS

CROSS-REFERENCE TO RELATED APPLICATIONS

This application claims the benefit of U.S. Provisional Application Ser. No. 60/827,665, filed on Sep. 29, 2006, incorporated by reference herein in its entirety.

BACKGROUND OF THE INVENTION

1. Field of the Invention

The present invention is related to rendering digital maps in a network environment. In particular, the present invention provides a system and method for enabling real-time updates to a map rendering configuration file.

2. Description of the Related Art

Digital maps are frequently used on networks such as the Internet to display locations of businesses and residences, to obtain driving directions, or for various other purposes. The maps are typically rendered by specialized software known as map rendering software using a predefined configuration. One example of map rendering software is the Drill Down Server by deCarta, Inc. of San Jose, Calif.

Map rendering software is typically configured by providing a set of instructions to a server using a configuration syntax. For example, the configuration syntax typically allows for the specification of which cartographic features will be rendered, the style in which the features are rendered, and the map scale to which a particular configuration is applicable. Label placement, fonts, colors, opacity and many other parameters can also be specified.

When the server starts, the map rendering configurations are read from files, creating a static set of available map styles. New configurations typically cannot be added without restarting the server.

In a web-based environment, maps are typically served up from an online provider of maps such as Yahoo!, MapQuest, or Google. Application developers can incorporate these maps into their web-based applications. For example, a site offering real estate service can provide maps rendered by one of the above providers in order to display the location of real estate for sale. However, aside from selecting from a different pre-designed map, there is no way for the application developer to make changes, in real-time, to the map's feature content, colors, labeling etc, because only the system administrator of the map server can typically affect changes to the configuration.

SUMMARY

The present invention enables map designers to provide real-time updates to customizable maps served over a network such as the internet. A map designer creates a map configuration file that specifies customizable attributes of a rendered map, e.g., which cartographic features are to be included on the map, the style in which the features are rendered, and the map scale to which a particular configuration is applicable. The designer then stores the configuration file in a data store, either on the same local network as the map server that will be rendering the map, or at a remote location reachable via a resource locator such as a URL or other network address. The map configuration file can be included on a web page, wiki page, blog, and the like next to other non-configuration file content. A tag or marker in the content indicates to the map server where the map configuration file exists at the identified resource.

When a client requests a rendered map from the map server, the request specifies the location of the map configuration file that should be used in the rendering. The map server retrieves the map configuration file and renders the requested map in accordance with the specified settings from the configuration file. The map server then returns the rendered map to the client that requested it. In such a manner, the developer can modify the map configuration file and immediately effect subsequently rendered maps.

Map server may be implemented in clusters, and for performance reasons may cache map configuration files. To avoid losing the ability to have a designer's changes implemented immediately, a flush command can be sent to all of the map servers in the cluster, instructing them to retrieve a fresh copy of the map configuration file prior to its next use. The flush command may be included, for example, in a request sent by a client to the map server for a rendered map.

A system in accordance with the present invention also includes a graphical user interface that enables a map designer to create and edit the map configuration file using a conventional web browser. A preview function allows the designer to see the impact of modifications made to the configuration file. Because the configuration file is stored by the system, the designer does not need to have local storage or serving ability in order to design and implement a configuration file.

A designer of a map is able to host image configurations on a location such as a page identified by URL. The URL can point to a web page hosted by the designer or a third party, or to a blog or wiki page, etc. In reading the content of the page identified by the URL, the map server distinguishes the map configuration from other text on the page. This allows the designer of the map to embed his image settings in a blog or wiki page, where other text or imagery is present, before and after the image settings.

When a map is requested from the server, the requestor provides the URL of the map configuration data. The server downloads the configuration from the specified URL and renders the map according to the instructions in the configuration data. The map designer can change the image settings by editing his blog, wiki, or otherwise changing the content of the page specified by the URL.

BRIEF DESCRIPTION OF THE DRAWINGS

FIG. 4 illustrates an additional user interface page for editing map configuration settings in accordance with an embodiment of the present invention.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
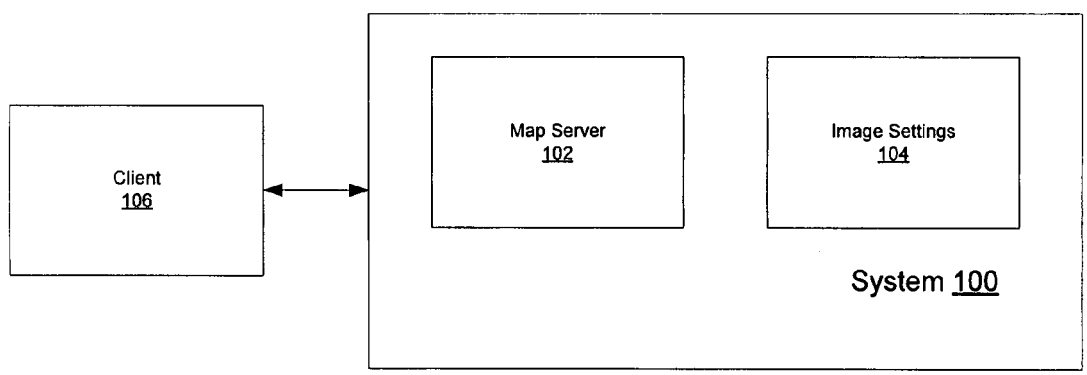
FIG. 1 is a block diagram illustrating a system for providing dynamic configuration settings to a mapping server in accordance with an embodiment of the present invention.

FIG. 1 illustrates a system for providing dynamic configuration settings to a mapping server in accordance with an embodiment of the present invention. System 100 includes a map server 102 and a map configuration file 104. Map server 102 provides rendered maps to a client 106 in response to a request from the client. When requesting a rendered map, client 106 can specify which cartographic features are to be included on the map, the style in which the features are rendered, and the map scale to which a particular configuration is applicable. Label placement, fonts, colors, opacity and other parameters can also be specified. Map server 102 in one embodiment includes a default set of map rendering configurations that are used to render maps in the absence of a specified image settings file.

Although only one map server 102 is illustrated in FIG. 1, system 100 may be implemented in a clustered server environment, and have many such map servers. The illustration in FIG. 1 is for ease of explanation and is not intended to be limiting.

Client 106 is a computer system requesting a rendered map from system 100. The client may be a consumer viewing a map for some purpose such as locating a business or residence, or obtaining driving directions. The client may also be another website that embeds a map on one or more of its web pages. For example, the client may be a real estate broker that displays maps of real estate for sale to visitors to its web site. Client 106 may also be a map designer interested in specifying real-time configuration settings to system 100. For purposes of illustration, we assume that the client 106 is of the latter type.

Map configuration file 104 is a file that includes the configuration settings to be provided to map server 102. In one embodiment, configuration file 104 is a text file, web page, or wiki page located on a remote server. Alternatively, configuration file 104 may be located on the same local area network or subnet as map server 102, as described further below.

Map server 102 is configured to read map configuration settings from map configuration file 104 at a location specified by client 106. In one embodiment the map designer prepares a file such as a web page that includes the configuration settings and publishes the web page to a location remote from map server 102. When client 106 requests a rendered map, the request includes a resource identifier such as a URL indicating the location of the configuration file 104, in this case the remote web page. The URL can point to a web page hosted by the designer or a third party, or to a blog or wiki page, etc. In reading the content of the page identified by the URL, the map server distinguishes the map configuration from other text on the page, for example by ignoring all text until a predefined marker or tag is encountered. This allows the designer of the map to embed image settings in a blog or wiki page, where other text or imagery is present, before and after the image settings.

When map server 102 receives a request from a client 106 including a URL or other identifier indicating that configuration settings are stored in a retrievable location, server 102 downloads the configuration from the specified URL and renders the map according to the instructions in the configuration data. In this manner, the map designer can change the image settings by editing his blog, wiki, or otherwise changing the content of the page specified by the URL.

In practice, it can be inefficient for server 102 to download the image configurations each time a map is rendered. For example, the server hosting the image settings 104 might be slow to serve the content, adversely affecting the user experience of the map consumer; the content of the image settings file 104 might be large, leading to long network transfer times, and increased bandwidth consumption for each map drawn, ultimately affecting the performance and cost of the solution; and map server 102 has to parse and implement the configuration for each map drawn.

Therefore, in one embodiment the map server caches the content of the configuration file 104. By caching the content, the above problems are addressed. However, caching the content introduces a new problem: map server 102 does not become aware of any changes to the image settings until it is restarted and reloads the configuration file 104. If not otherwise addressed this would defeat the purpose of real-time map design, in which changes made to the configuration can be immediately viewed on a map.

To obviate such a concern, in one embodiment, system 100 allows a client 106 to notify map server 102 that the content of the configuration file 104 has changed. In this way, when server 102 renders a map, it recognizes whether it needs to re-retrieve the content of the configuration file. In a clustered server environment, the notification may be broadcast to each map-rendering server in the cluster. The servers may choose to immediately download the changed content, or defer downloading the new content until a map requiring the given image settings is requested. The notification that the remote URL is "dirty" (i.e. has new content), can be piggybacked on the request to the map server for the map image, or can be provided as an explicit flush request sent to the server 102. Another practical consideration is security. Typically, firewalls protecting web-based servers such as map server 102 are configured for security reasons not to allow outbound-initiated connections from the servers behind the firewalls. This can prevent the map server 102 from initiating a connection to the configuration file 104 if it is located outside of an allowed subnet. As a practical solution, the map server, or associated servers behind the same firewall may provide a library, wiki, blog, or other repository for storing image configuration settings 104 within the reach of map server 102, and where clients 106 can edit their map configurations over the web. In this manner, the map server retrieves image settings URLs without initiating an outbound connection through its firewall.

Figure 2:
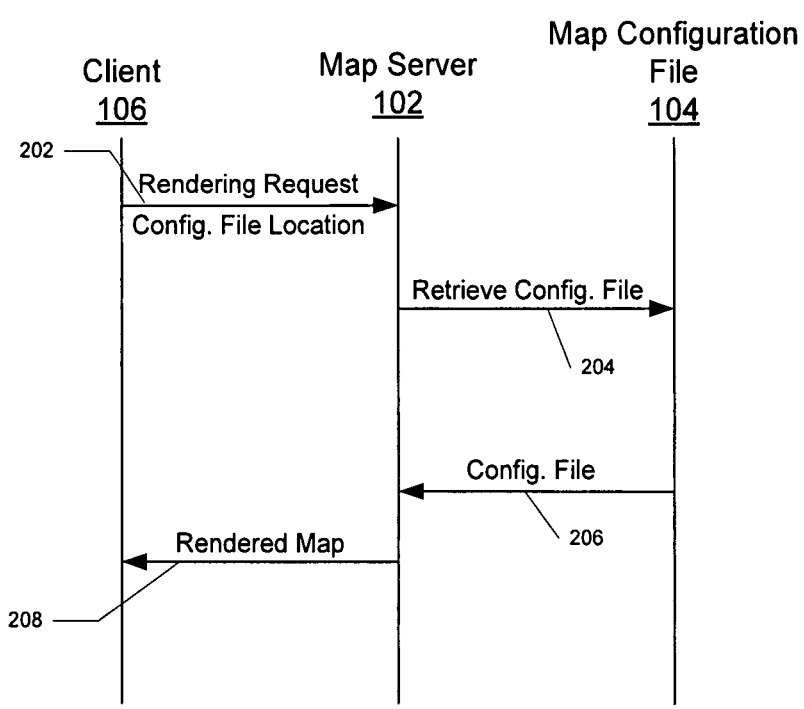
FIG. 2 is an interaction diagram illustrating a method for providing dynamic configuration settings to a mapping server in accordance with an embodiment of the present invention.

FIG. 2 is an interaction diagram illustrating the operation of system 100 in accordance with an embodiment of the present invention. To begin, a client 106 sends 202 a request to map server 102 for a rendered map. The request specifies a URL for a map configuration file 104 that the client 106 wants the server to use. Next, map server 102 retrieves 204 the map configuration file 104 from the specified location. As noted above, the specified location may be a web page, text file, wiki page, or the like. The map configuration file 104 is returned 206 to the map server 102, which then renders the map using the settings in the configuration file, and returns 208 the rendered map to the client 106.

In the following example drill down server query language (DDSQL) query below, an IMAG query is used to request a JPG formatted image. A latitude and longitude are provided via the LL keyword, and a zoom level of 0.4 km is specified via the ZM keyword. The SETTINGS argument points to a named setting and the URL where the settings reside. The settings name is drypen-tile and the URL where the settings resides is http://ws.decarta.com:8080/openls/library?clientName=someclient&clientPassword=abc123&readFile=drypen.cfg:

```
IMAG|%FORMAT=JPG%PD=200,200%LL=47.500761999999995,-
122.265473%ZM=K0.4%CUST=someclient|%SETTINGS=drypen-
tile,http://ws.decarta.com:8080/openls/library?clientName=someclient&client
Password=abc123&readFile=drypen.cfg%LLMIN%LLMAX%EXTIME%DS=navteq||
```

Note that in this illustrated case, the URL points to an online repository where clients can keep their image settings. The URL may contain either a "readFile" or "writeFile" parameter. In the case of "readFile", the client will read back the bytes of the image settings file. In the case of "writeFile" the client will post the new or modified image settings to the URL, e.g., by including the content of the configuration file as the body of an HTTP post. The library in one embodiment is an integrated part of deCarta Web Services, though many implementations are possible as will be appreciated by those of skill in the art. Providing a library as part of system 100 in which designers can store image settings files 104 not only avoids the security difficulties described above, but also enables clients that not have access to a web server, blog, or wiki, to still use configuration files. In the illustrated case, security is also provided through the clientName and clientPassword URL parameters. This prevents unauthorized users from reading or writing the image settings, and allows a developer's investment in customized image settings to be protected from unauthorized access or piracy.

In one embodiment, an instruction to server 102 to discard cached settings and retrieve the settings again from map configuration file 104 can be sent along with the rendering request. For example, the following DDSQL is identical to the command above, except that it includes a flag named FLUSH, which instructs the server to flush any cached content from the SETTINGS URL, and to download new content:

```
IMAG|%FORMAT=JPG%PD=200,200%LL=47.500761999999995,-
122.265473%ZM=K0.4%CUST=someclient%SETTINGS=drypen-
tile,http://ws.decarta.com:8080/openls/library?clientName=someclient&client
Password=abc123&readFile=drypen.cfg%LLMIN%LLMAX%EXTIME%DS=navteq|%FLUSH|
```

Figure 3:
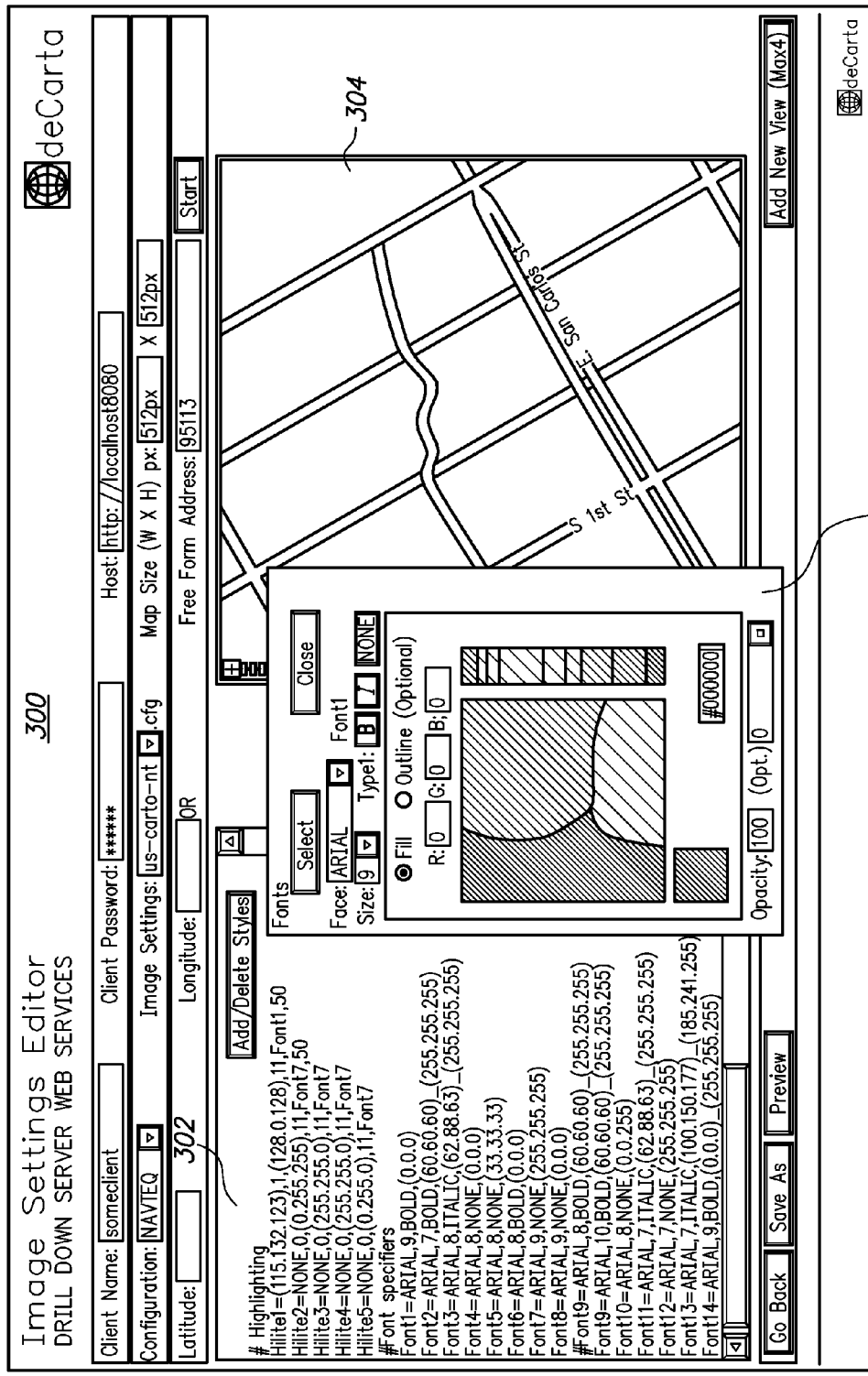
FIG. 3 illustrates a user interface page for editing map configuration settings in accordance with an embodiment of the present invention.

The syntax for a map configuration file 104 can be implementation-specific. In one embodiment, a graphical user interface tool can be used to create and edit map configuration files 104 over a network such as the Internet. FIG. 3 illustrates a user interface (UI) screen 300 for editing image settings in accordance with an embodiment of the present invention. User interface screen 300 can be accessed as a web page using an Internet browser, and includes a text region 302 showing the actual contents of the configuration file, as well as a preview region 304 that provides the designer with a preview of how the current settings will look when applied. FIG. 3 also illustrates a font and color selection box 306 as an example of the customizability of the image settings file. Accordingly, user interface 302 allows advanced users to directly access the image settings file via text editing region 302, and allows less advanced users to perform customizations without having knowledge of the configuration file syntax simply by making graphical changes to the preview map via the user interface.

FIG. 4 provides a second illustration of a user interface screen 400 for editing image settings in accordance with an embodiment of the present invention. In the illustrated case, the UI allows a designer to specify fonts and colors for different map features, such as parks, water, campuses, political features, interior features, buildings and vendors. Preview panes 402 provide examples of how the selected styles will look on a rendered map, for example at different zoom levels.

The present invention has been described in particular detail with respect to a limited number of embodiments. Those of skill in the art will appreciate that the invention may additionally be practiced in other embodiments. For example, the functionality of the map server can be provided in other embodiments by other modules. The present invention also has application beyond the simplification of digital maps. For example, in various embodiments the present invention can be used to specify custom configuration settings for other server-based applications.

Within this written description, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "selecting" or "computing" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

I claim:

1. A method for providing a digital map, the method comprising:
    receiving, by a computer, a request for a digital map, the request including geographic location information and a location of a map configuration data file, the configuration data file including configuration data specifying a manner in which cartographic features of the digital map are to be rendered;
    retrieving from the included location the configuration data file;
    caching the retrieved configuration data;
    identifying, from the configuration data file, image settings and cartographic features to be included in the rendering of the requested map;
    rendering, by the computer, the requested map using the location specified by the received geographic location information and including cartographic features associated with the specified geographic location and rendered in the manner specified by parameters included in the configuration data file; and
    returning the rendered map; and
    responsive to receiving an instruction to discard the cached configuration data, discarding the cached configuration data and instructing a plurality of additional map servers to discard the cached configuration data.

2. The method of claim 1 wherein the location of the configuration data file is specified by a URL.

3. The method of claim 2 wherein the file identified by the URL is a web page, and the web page includes the configuration data.

4. The method of claim 1 wherein the location of the configuration data file is specified by a network address.

5. A system for providing a digital map, the system comprising:
    a map server, adapted to:
        receive a request for a digital map, the request including a geographic location and a location of a map configuration data file including map configuration data specifying a manner of rendering cartographic features of a map image settings and cartographic features to be included in the rendering of the requested map;
        retrieve the map configuration data from the data file at the location specified in the request;
        cache the retrieved configuration data;
        render a digital map including cartographic features of the requested geographic location, the cartographic features rendered according to the retrieved configuration data; and
        return the rendered map; and
        responsive to receiving an instruction to discard the cached configuration data, to discard the cached configuration data and instruct a plurality of additional map servers to discard the cached configuration data.

6. A method for providing a digital map, the method comprising:
    providing a map configuration data file to a data store, the data file specifying customizable attributes of a digital map, including image settings and cartographic features to be included in a rendering of the map;
    requesting, by a client, that a map server render a digital map, the request specifying a geographic location to be included in the rendered map, and including a reference to the provided data file stored in the data store; and
    receiving, by the client, a rendered map from the map server, the rendered map having cartographic features of the specified geographic location rendered according to the customizable attributes specified in the data file; and
    instructing the server to discard a cache of the configuration data and to instruct a plurality of additional map servers to discard cached configuration data.

7. The method of claim 6 further comprising:
    providing a modified map configuration data file to the data store, the modified data file replacing the map configuration data file;
    requesting, by the client, that the map server render a second digital map, the request including a reference to the modified data file; and
    receiving, by the client, a second rendered map from the map server, the second rendered map having cartographic features rendered according to the modified data file.

8. The method of 7 wherein the request further includes an instruction to the map server to retrieve the modified data file from the data store.

9. A method for providing dynamic map configuration files to a map rendering server, the method comprising:
    establishing, by a computer, a connection to a map configuration file host, the host having a graphical user interface;
    providing, by the computer, a plurality of map configuration attributes to the host via the graphical user interface, the configuration attributes specifying image settings and cartographic features to be included in the rendering of a digital map;

storing, by the computer, the configuration file at a location identifiable by a resource identifier; and instructing, by the computer, the map server to render a map using the stored configuration file, the instruction including the resource identifier for the configuration file and a geographic location to be rendered; and instructing, by the computer, the map server to discard a cache of the configuration data and to further instruct a plurality of additional map servers to discard caches of the configuration data.

10. The method of claim 9 wherein the plurality of configuration attributes includes label placement.

11. The method of claim 9 wherein the plurality of configuration attributes includes fonts to be used in rendering a map.

12. The method of claim 9 wherein the plurality of configuration attributes includes opacity levels to be used in rendering a map.

13. The system of claim 5 wherein the location of the configuration data file is specified by a URL.

14. The system of claim 13 wherein the file identified by the URL is a web page, and the web page includes the configuration data.

15. The system of claim 13 wherein the location of the configuration data file is specified by a network address.

16. The method of claim 6 wherein the reference to the provided data file is a specified by a URL.

17. The method of claim 9 wherein the resource identifier is a URL.

18. The method of claim 1 wherein the parameters include label placement.

19. The method of claim 1 wherein the parameters include fonts.

20. The method of claim 1 wherein the parameters include opacity levels.

* * * * *